UNITED STATES PATENT OFFICE.

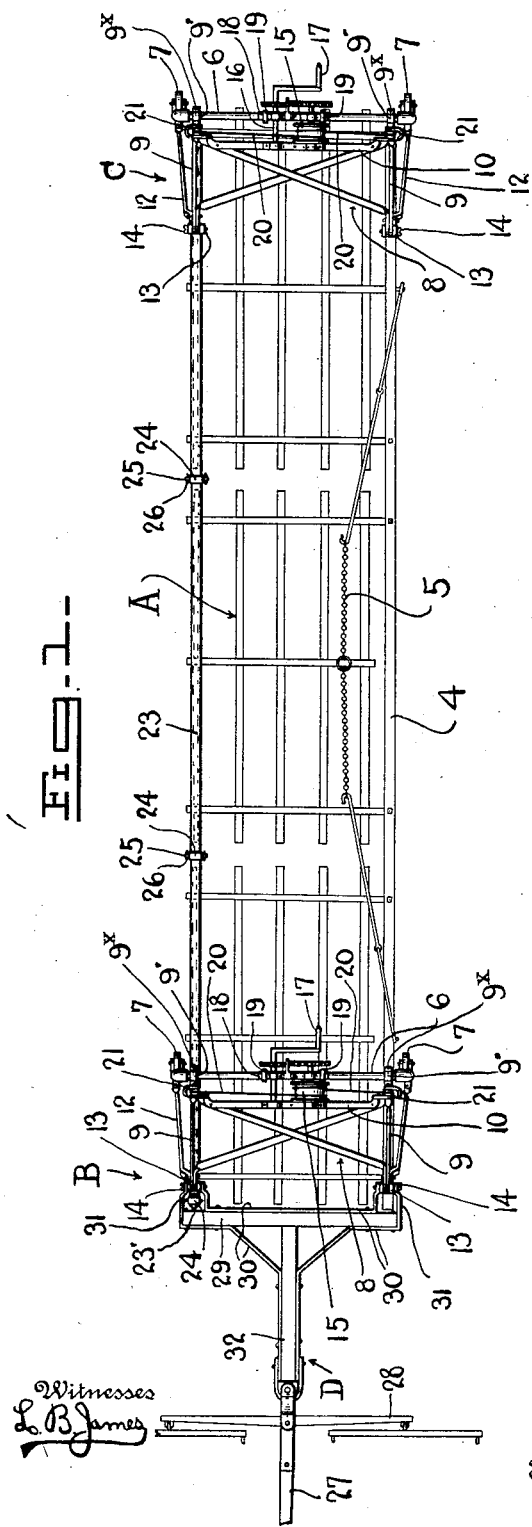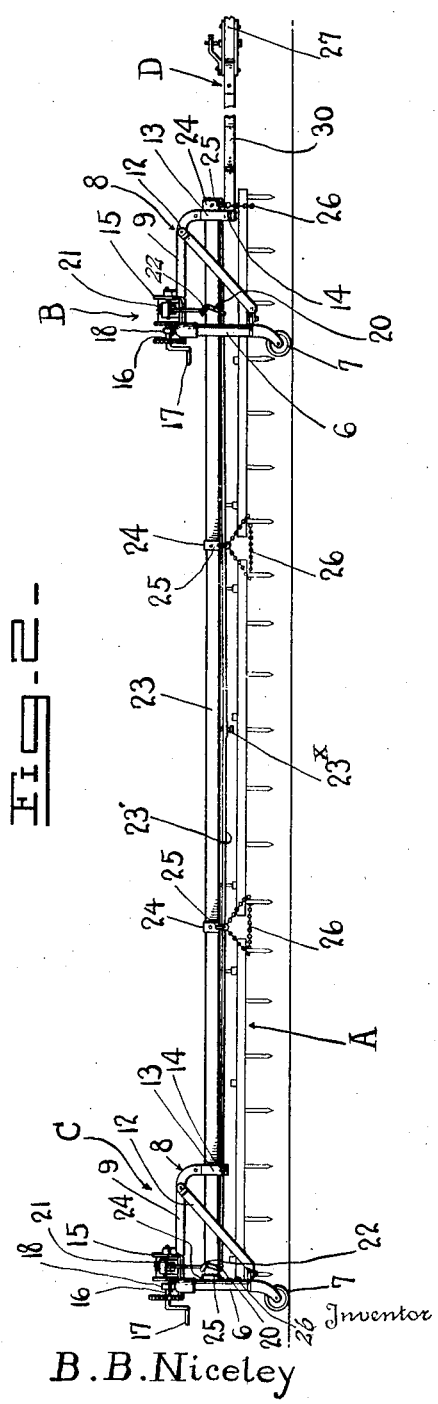

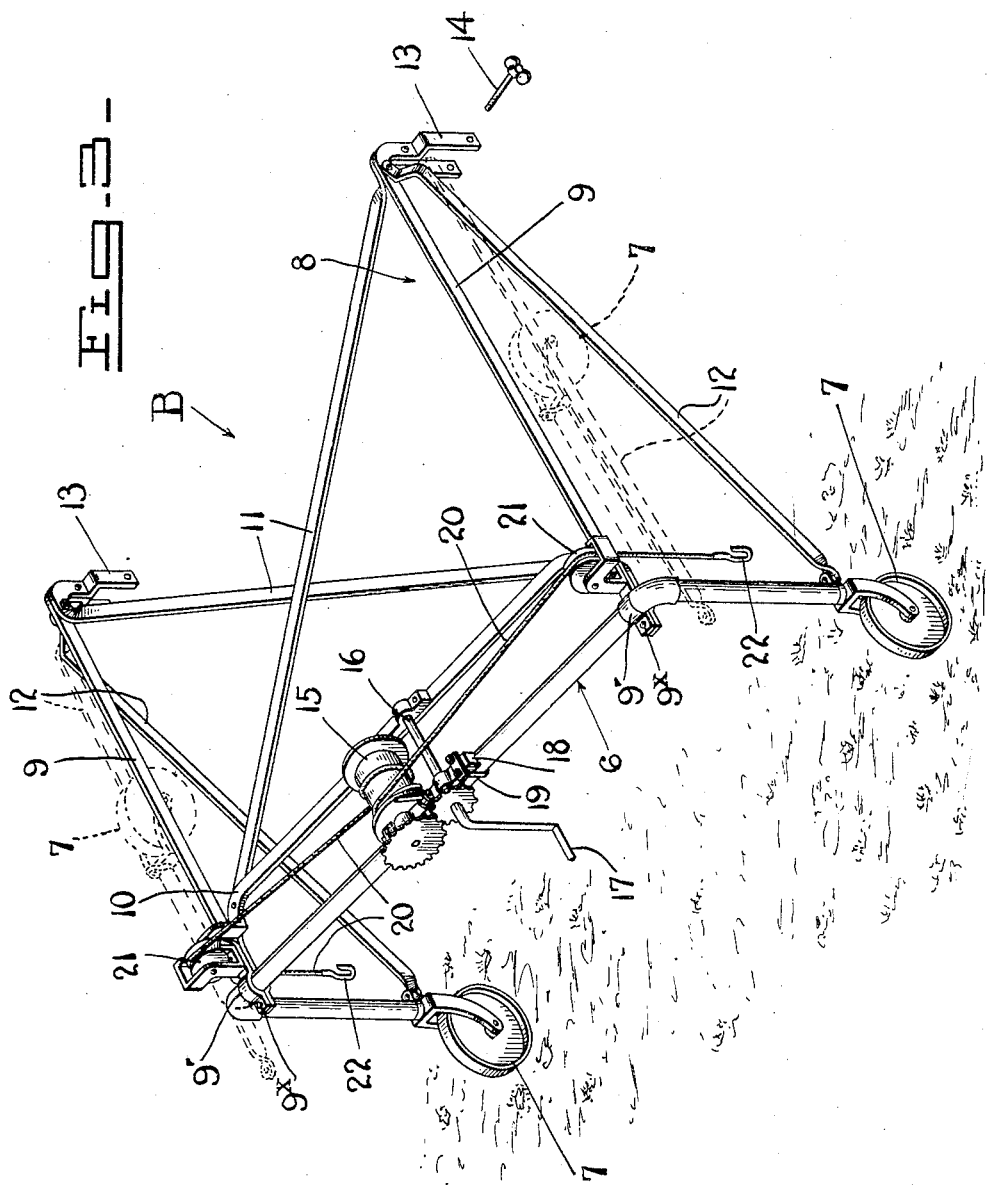

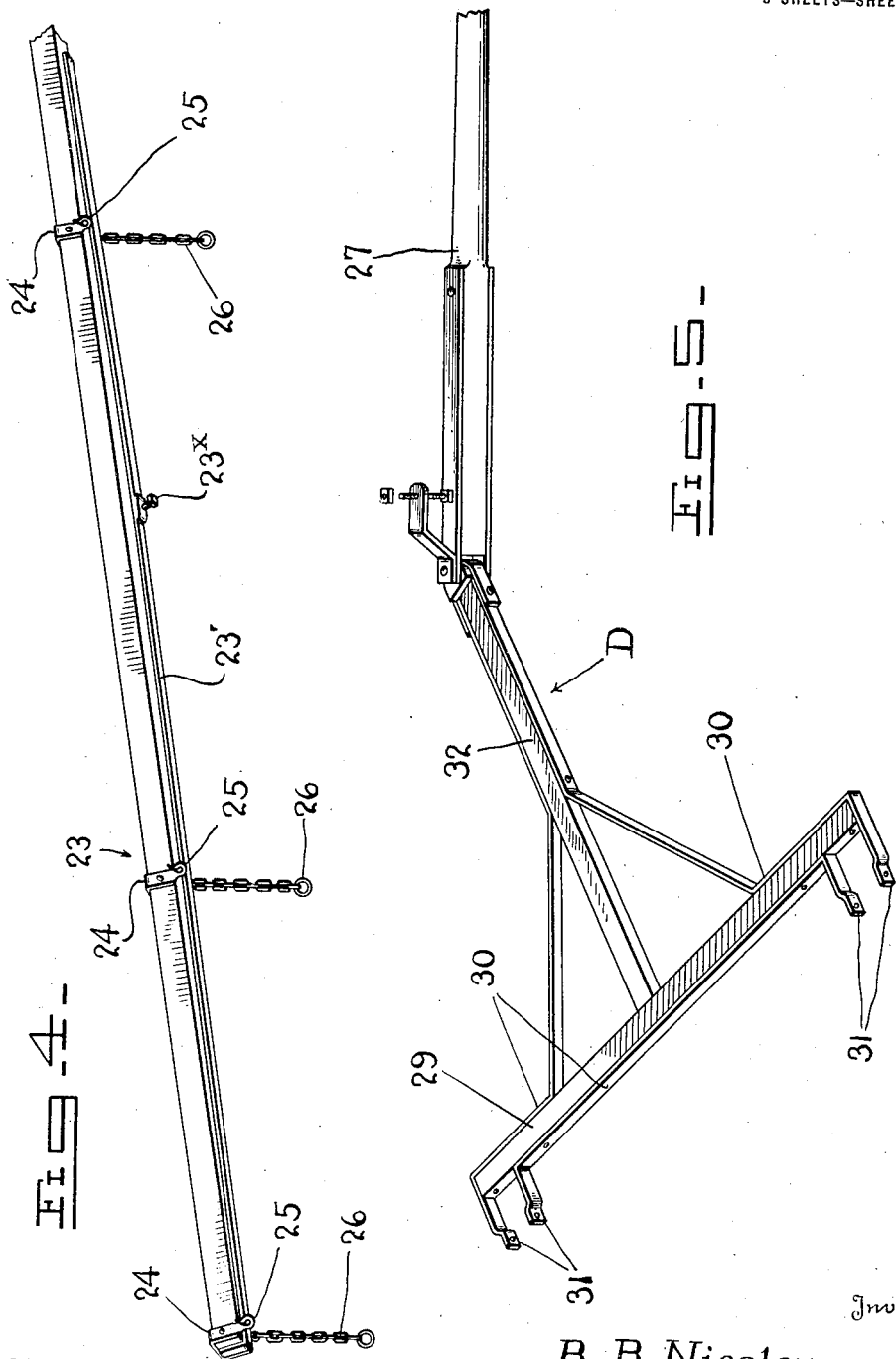

BAYARD B. NICELEY, OF LUTTRELL, TENNESSEE.

HARROW-TRUCK.

1,348,039.  Specification of Letters Patent.  Patented July 27, 1920.

Application filed October 17, 1919. Serial No. 331,367.

*To all whom it may concern:*

Be it known that I, BAYARD B. NICELEY, a citizen of the United States, residing at Luttrell, in the county of Union and State of Tennessee, have invented new and useful Improvements in Harrow-Trucks, of which the following is a specification.

This invention relates to trucks for transporting agricultural implements and the invention is more particularly designed for use with sectional harrows, the principal object of the invention being to carry the harrow without separating the sections.

Another object of the invention is to provide a truck for each end of the harrow, each truck being provided with means for securing it to the harrow and also means for raising the harrow off the ground.

Still another object of the invention is to provide means whereby the trucks with the harrow attached may be easily turned while traveling along the road or across the field.

A still further object of the invention is to provide a detachable tongue which may be attached to either truck so that either may be made the pulling truck.

This invention also consists in certain other features of construction and in the combination and arrangement of the several parts, to be hereinafter fully described, illustrated in the accompanying drawings and specifically pointed out in the appended claims.

In describing my invention in detail, reference will be had to the accompanying drawings wherein like characters denote like or corresponding parts throughout the several views, and in which:—

Figure 1 is a plan view showing a three section harrow connected with a pair of the trucks.

Fig. 2 is a view looking toward the upper side of Fig. 1.

Fig. 3 is a perspective view of one of the trucks.

Fig. 4 is a perspective view of the auxiliary bar for engaging the rear side of the harrow.

Fig. 5 is a view of the tongue and the means for attaching it to the truck.

In Figs. 1 and 2 A indicates the harrow which in this case is shown as consisting of three sections. These sections are hingedly connected at the front sides with the usual draft bar 4, which carries the bars and chains 5 to which the doubletree is connected. This draft bar extends the full length of the harrow and it will be understood that the sections and draft bar form no part of my invention.

One of my trucks is shown at B, which in this case is the front truck and the other truck is shown at C, this being the rear truck.

Each truck is composed of a U-shaped wheeled frame 6, which is preferably formed of tubing and its ends carry the caster wheels 7. This wheeled frame supports the horizontal frame 8 which is made up of the side pieces 9, the end piece 10 and the cross pieces 11. Side braces 12 extend from the free ends of the side pieces to the lower part of the wheeled frame. The horizontal frame is attached to the wheeled frame by the clamp parts 9' formed on said end pieces and which are clamped in adjusted position by the bolts 9$^x$. The other ends of the side pieces are bent downwardly and forked as at 13 and the forks are provided with holes to receive the bolts 14.

A drum 15 has its shaft journaled to the cross bar of the wheeled frame and the end piece 10 of the horizontal frame and this drum is geared to a shaft 16, also journaled in said pieces, and which is provided with a handle 17. The journal blocks 18 are provided with concaved faces for engaging the tubular cross piece of the wheeled frame and are clamped on the frame by the clamping clips 19 for a purpose to be hereinafter described.

The drum has wound thereon cables 20, the ends of which pass over pulleys 21 carried by the side pieces 9 and these ends are provided with hooks 22.

By the construction of the truck frame as just described by loosening the bolts 9$^x$ and the nuts of the clamping clips 19 the wheeled frame may be swung upwardly into the position shown in dotted lines in Fig. 3, after detaching one end of each of the side braces 12. When in this position the truck will occupy but little space so that it may be stored or shipped while in this folded condition so that it will occupy the minimum amount of space.

I provide an auxiliary bar 23 which is similar to the draft bar and this bar is provided with the U-shaped clips 24, one end of each of which is provided with a hook 25 and the other end has connected thereto the chain 26. These clips are spaced apart a distance equal to the length of the section so that the clips will be located at the ends of the sections when the bar is placed in position. Each chain is then passed around the teeth of the harrow at the adjacent corners of two of the sections and hooked over the hooks 25 so that the sections are secured to the bar.

After this auxiliary bar is secured to the rear side of the harrow the draft bar is swung upwardly, as shown in Fig. 1 and the trucks are then positioned with the forks 13 straddling the two bars. The bolt 14 is then placed in position to hold the bars in the forks. The cables 20 are then secured to the bars by means of the hooks 22. In this position it will be understood that the harrow is resting on the ground and the bars on the harrow so that the trucks are tilted with the forked ends of the horizontal frame resting on the bars. The handle 17 of each truck is then turned to rotate the drum to wind up the cable. This will lift the bars and the harrow sections and cause the trucks to assume the position shown in Fig. 2 with the side bars 9 in horizontal position. As will be seen the rear truck C has its forks engaging the part of each bar a distance from the ends of the bars, with the ends of the bars reaching to the wheel frame. The truck B has its horizontal frame extending in the same direction as truck C so that the wheeled frame is spaced from the ends of the bars with its forks engaging said ends. This arrangement is clearly shown in Figs. 1 and 2.

The tongue frame D is then attached to the front truck so that the horses or tractor may be hitched thereto by means of the tongue 27 and the trees 28 and the harrow pulled to the point desired.

This tongue frame consists of a cross piece 29 to which front and rear straps 30 are secured. These straps have their ends bent at right angles to provide the forks 31 and these forks engage with the forks of the truck and are connected thereto by the bolts 14. The front straps 30 are bent and connected with the tongue carrying member 32 so as to form braces for this member. The tongue 27 is pivoted to the outer end of the member 32 in the usual manner.

In order to strengthen the auxiliary bar 23 I provide a truss 23' which has its ends bent around the ends of the bar and a bow of this truss may be adjusted by the bolt 23* passing through the center of the truss and engaging the bar 23.

By the arrangement of the tongue and caster wheels the truck with the harrow attached may be made to turn about a small circle so that there will be no difficulty in transporting the device from place to place and passing through gates.

It is thought from the foregoing description that the advantages and novel features of my invention will be readily apparent.

I desire it to be understood that I may make changes in the construction and in the combination and arrangement of the several parts, provided that such changes fall within the scope of the appended claims.

What I claim is:—

1. A device for transporting agricultural implements comprising a pair of trucks, each comprising a frame of rightangular shape, wheels carried at one end of the frame, attaching means carried at the other end of the frame, a drum carried by the frame at the wheeled end thereof, cables attached to the drum and extending transversely across the frame, hooks at the outer ends of the cables and pulleys on the frame over which the cables pass.

2. A truck of the class described comprising a wheeled frame of substantially U-shape, wheels on the ends of said frame, a horizontal frame having one end connected with the cross piece of the wheeled frame, connecting means carried by the other end of said horizontal frame, a drum having its shaft journaled on the cross piece of the wheeled frame and a part of the horizontal frame, cables attached to the drum and extending parallel with the cross piece of the wheeled frame, hooks on said cables and supporting rollers on the horizontal frame for said cables.

3. A truck of the class described comprising a wheeled frame of substantially U-shape, wheels attached to the ends of said frame, a horizontal frame adjustably attached to said wheeled frame, attaching means carried by said horizontal frame at the outer end thereof and lifting means on the truck having their attaching parts located at the sides of the horizontal frame.

4. A truck of the class described comprising a wheeled frame of substantially U-shape, wheels attached to the ends of said frame, a horizontal frame adjustably connected with the cross piece of said wheeled frame, forks at the free ends of said horizontal frame, a drum on the truck, a cable attached to the drum and winding means for the drum.

5. A truck of the class described comprising a wheeled frame, a horizontal frame attached thereto, and having forked ends, means for holding the device to be transported in said forks, a tongue carrying frame detachably connected with said forks by said means and a tongue connected with said frame.

6. A device for transporting harrow sections comprising a pair of trucks to be placed at the ends of the harrow, a horizontal bar, means thereon for attaching the same to the rear of the harrow sections and means on the trucks for connecting the same with the end portions of said bar and with the end portions of the draft bar of the harrow.

7. A device for transporting harrow sections comprising a pair of trucks to be placed at the ends of the harrow, a horizontal bar, means thereon for attaching the same to the rear of the harrow sections, means on the trucks for connecting the same with the end portions of said bar and with the end portions of the draft bar of the harrow and lifting means on the trucks engaging said bars.

In testimony whereof I affix my signature.

BAYARD B. NICELEY.